United States Patent [19]
Iida et al.

[11] Patent Number: 5,298,698
[45] Date of Patent: Mar. 29, 1994

[54] ENCODER SWITCH WITH CONDUCTIVE PATTERNS AND LEADS

[75] Inventors: Yoshikazu Iida, Chigasaki; Toru Kosaka, Zama; Hiroyuki Tsuru, Tokyo; Masashi Hashimoto, Narashino, all of Japan

[73] Assignee: Nikon Corporation, Tokyo, Japan

[21] Appl. No.: 778,453

[22] Filed: Oct. 17, 1991

[30] Foreign Application Priority Data

Oct. 26, 1990 [JP] Japan ................. 2-111671[U]

[51] Int. Cl.$^5$ .............. H01H 19/58; H01H 1/00; G01D 5/02
[52] U.S. Cl. .................. 200/11 DA; 200/11 G; 200/16 D; 200/292
[58] Field of Search ............. 200/11 R, 11 D, 11 DA, 200/11 G, 11 J, 11 TW, 16 C, 16 D, 292

[56] References Cited

U.S. PATENT DOCUMENTS

| | | | |
|---|---|---|---|
| 2,896,033 | 7/1959 | Hartz | 200/11 D |
| 3,030,460 | 4/1962 | Huetten et al. | 200/11 D |
| 3,089,923 | 5/1963 | Wright | 200/5 A |
| 3,531,603 | 9/1970 | Ashman | 200/11 D |
| 4,135,065 | 1/1979 | Nicot | 200/11 DA |

Primary Examiner—J. R. Scott
Attorney, Agent, or Firm—Shapiro and Shapiro

[57] ABSTRACT

An encoder for generating a position signal in accordance with a position of a conductive slider comprises a non-conductive substrate, a first conductive pattern formed on the substrate, and at least three second conductive patterns formed on the substrate. The second patterns are independent from the first pattern. Each of the second patterns has a lead wire extending to an edge of the substrate. The slider is slidable on the substrate, and produces a conductive state signal when it abuts against the first pattern and produces a non-conductive state signal when it abuts against the second pattern or the substrate. The position signal is generated in accordance with the conductive state signal and the non-conductive state signal. One of the second patterns is surrounded by the first pattern, and the lead wire extending therefrom passes between the other two second patterns and extends to the exterior of the first pattern.

2 Claims, 4 Drawing Sheets

FIG. 6

|   | ① | ② | ③ | ④ | ⑤ | ⑥ | ⑦ | ⑧ | ⑨ | ⑩ | ⑪ | ⑫ | ⑬ | ⑭ | ⑮ | ⑯ |
|---|---|---|---|---|---|---|---|---|---|---|---|---|---|---|---|---|
| A | H | H | H | H | H | H | H | L | L | L | L | L | L | L | L | L |
| B | H | H | H | H | L | L | L | L | L | L | L | L | H | H | H | H |
| D | H | H | L | L | L | H | H | H | L | L | L | L | H | H | H | H |
| E | H | L | L | H | H | L | L | H | H | L | H | H | L | L | L | H | the present invention,

ENCODER SWITCH WITH CONDUCTIVE PATTERNS AND LEADS

BACKGROUND OF THE INVENTION

1. Field of the Invention

The present invention relates to an encoder, and more particularly to an encoder which detects a position signal by sliding a slider thereon.

2. Related Background Art

In a camera with a variable focal distance lens, it is necessary to check what focal distance the lens is set to. To this end, a flexible printed circuit board which mounts an encoder having a signal pattern incorporated therein is provided around a cylinder of a lens bodytube, and a slider sliding along a surface of a substrate is used to detect the focal distance.

The encoder used in the prior art has the signal pattern formed by a copper deposition on a surface of a polyester film substrate, and the surface is plated with gold.

A protective pattern (hereinafter called an idle pattern) is provided in order to protect a surface of a polyester film substrate having no signal pattern from abrasion by the slider and to avoid an error signal due to abrasion particles. By properly setting an interval between the idle pattern and the signal pattern, the slider does not contact the surface of the polyester film substrate and no abrasion takes place.

However, because of the need for increased lens information in sophisticated camera systems, the signal pattern of the encoder has become complex. As a result, the idle patterns are also complex and the number thereof increases, and an idle pattern which does not face (is not adjacent to) an outer edge of the polyester film substrate (hereinafter referred to as an island idle pattern) has appeared.

The idle pattern does not necessarily need a lead wire to form the copper deposition, but a lead wire is required on the surface of the substrate in a gold electrolytic plating process.

SUMMARY OF THE INVENTION

It is an object of the present invention to provide an encoder which permits the formation of a deposition of an island idle pattern by gold deposition by electrolytic plating and which is sufficiently durable against abrasion.

In order to achieve the above object, the encoder of the present invention comprises a signal pattern 2 for transmitting a position signal by the slide of sliders 21-25, formed on a surface of a substrate 1 and protective patterns 3-15 formed at portions where the signal pattern is not provided, a protective pattern 8 surrounded by other patterns 2, 14 and 15 and a lead wire (8a) formed in series with the protective pattern in an electrolytic plating process for forming the protective pattern. The lead wire extends between two other protective patterns 14 and 15.

The lead wire 8a of the island idle pattern 8, which is the protective pattern not adjacent to an outer edge of the substrate 1, extends from the signal pattern 2 between the other protective patterns 14 and 15 on the sliding line of the slider, so that the signal pattern and the lead wire are not adjacent to each other on the sliding line of the slider.

BRIEF DESCRIPTION OF THE DRAWINGS

FIG. 6 shows an output signal.

DETAILED DESCRIPTION OF THE PREFERRED EMBODIMENTS

Figure 1:
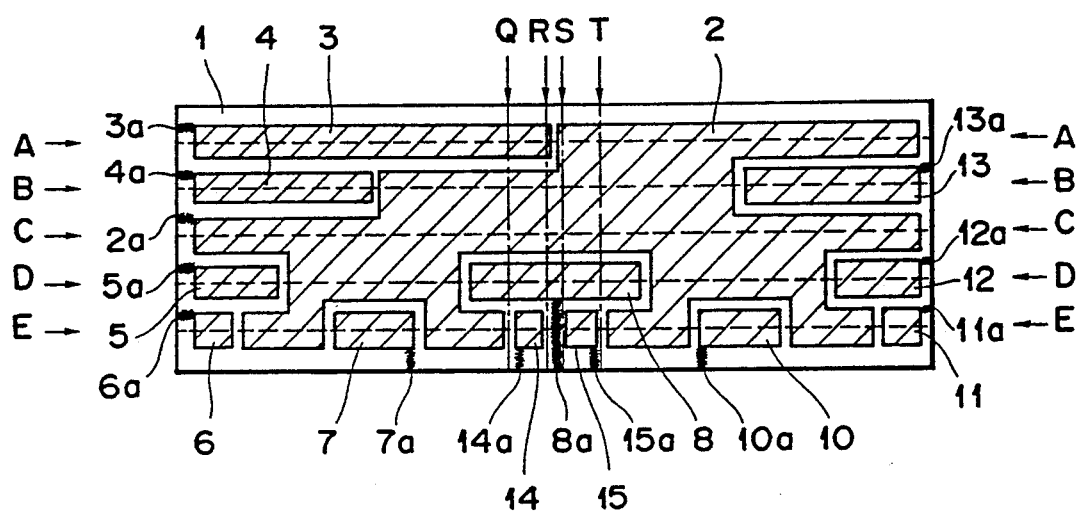
FIG. 1 shows one embodiment of the present invention.

FIG. 1 shows one embodiment of the present invention.

Numeral 1 denotes a substrate. Usually, it is polyester film.

Numeral 2 denotes a signal pattern. A copper film is deposited on a surface of the substrate 1 and gold is plated thereon.

Numerals 3, 4, 5, 6, 7, 8, 10, 11, 12, 13, 14 and 15 denote idle patterns. The idle patterns 3-8 and 10-15 also have copper films deposited on the surface of the substrate 1 and gold is plated thereon as they are in the signal pattern 2.

The idle patterns are provided with an appropriate interval therebetween to prevent contact to each other and to the signal pattern.

Numeral 2a denotes a lead wire for electrolytic plating of the signal pattern 2, and numerals 3a, 4a, 5a, 6a, 7a, 8a, 10a, 11a, 12a, 13a, 14a and 15a denote lead wires for the electrolytic plating of the idle patterns 3, 4, 5, 6, 7, 8, 10, 11, 12, 13, 14 and 15, respectively. They are narrow wire-shaped copper films formed to extend from the respective patterns to outer edges on the surface of the substrate 1 and are connectable to an external electrical terminal at a side edge of the substrate 1 in the gold electrolytic plating process. After the electrolytic plating, the gold plating is kept on the top surface.

Idle patterns 14 and 15 are arranged on the both sides of the lead wire 8a of the island idle pattern 8 extending to the outer edge of the substrate 1 so that no part of the island idle pattern 8 is adjacent to the signal pattern 2 on the sliding line of the slider.

Arrows A—A, B—B, C—C, D—D and E—E show directions and lines of slides of five sliders 21, 22, 23, 24 and 25 of a brush 26.

Arrows Q, R, S and T show intervals between the signal pattern 2 and the idle pattern 14, the idle pattern 14 and the lead wire 8a of the island idle pattern 8, the lead wire 8a of the island idle pattern 8 and the idle pattern 15, and the idle pattern 15 and the signal pattern 2, respectively.

The contact to the slider of the encoder is now explained with reference to FIGS. 1 and 2.

Figure 2:
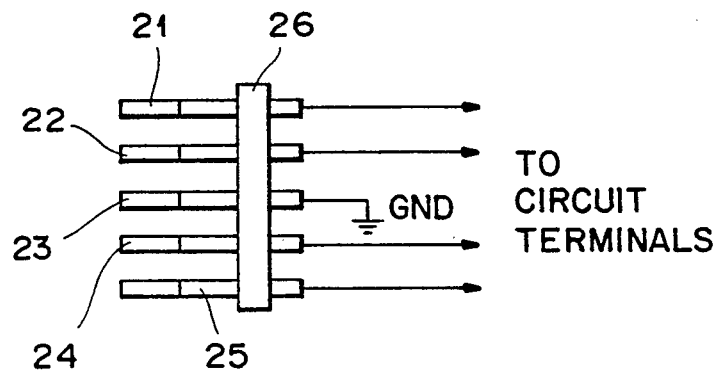
FIG. 2 shows a top view of a slider of an encoder.

FIG. 2 shows a top view of the slider of the encoder. The brush 26 has five sliders 21, 22, 23, 24 and 25 which slide along lines A—A, B—B, C—C, D—D and E—E, respectively, of the signal pattern 2 shown by broken lines in FIG. 1. More particularly, the slider 21 slides on the idle pattern 3 and the signal pattern 2; the slider 22 slides on the idle pattern 4, the signal pattern 2 and the idle pattern 13; the slider 23 slides on the signal pattern 2; the slider 24 slides on the idle pattern 5, the signal pattern 2, the idle pattern 8, the signal pattern 2 and the idle pattern 12; and the slider 25 slides on the idle pattern 6, the signal pattern 2, the idle pattern 7, the signal pattern 2, the idle pattern 14, the lead wire 8a of the island idle pattern 8, the idle pattern 15, the signal pattern 2, the idle pattern 10, the signal pattern 2 and the idle pattern 11. The sliders slide simultaneously in the foregoing sequences or in the opposite sequences.

The signals generated by the sliding of the brush 26 are now explained with reference to FIGS. 4 and 6.

Figure 4:
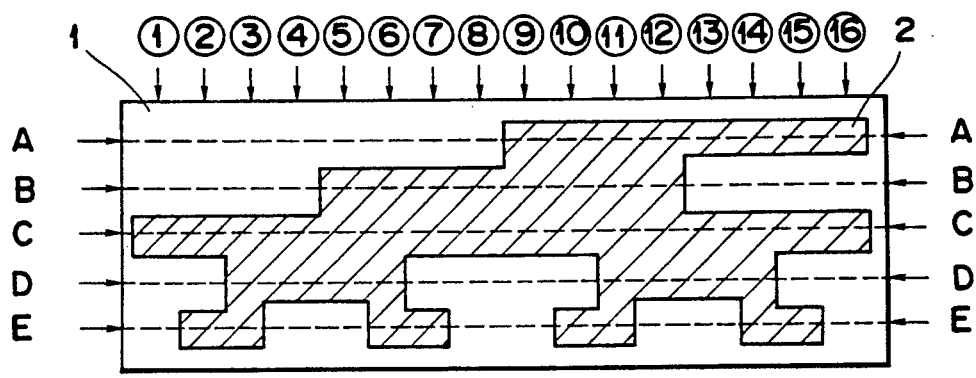
FIG. 4 shows a signal pattern.

FIG. 4 shows only the signal pattern 2 of FIG. 1 and portions divided into sixteen along the direction of sliding are sequentially numbered. FIG. 6 shows signals generated by the sixteen portions of FIG. 4 as the brush 26 is moved. The slider 23 which slides on the line C—C is connected to GND. The slider 23 always contacts to the signal pattern 2 which is always at the GND level.

The slider 21 which slides on the line A—A, the slider 22 which slides on the line B—B, the slider 24 which slides on the line D—D and the slider 25 which slides on the line E—E are connected to input terminals of a circuit (not shown). The input terminals are pulled up to a higher potential than the GND level so that they are at an H level when the sliders are not connected to GND and at an L level when they are connected to GND.

The contacts to the patterns or the lead wires when the sliders 21-25 are slid are now explained with reference to FIGS. 3A to 3D.

In FIGS. 3A to 3D, numeral 27 denotes a slider and numeral 28 denotes an idle pattern or a lead wire.

The interval between the signal pattern 2 and the idle pattern or the lead wire 28 is selected so that these elements do not contact each other and so that there is no contact between the slider 27 and the substrate 1 during the sliding of the slider 27 across the elements 2 and 28.

Figure 3A:
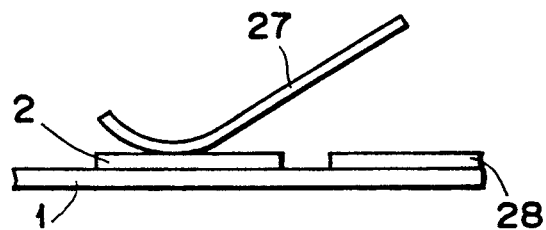
FIGS. 3A to 3D show contact between the slider and a pattern or lead wire.

In FIG. 3A, the slider 27 contacts to the signal pattern 2 and a signal of L level is produced.

Figure 3B:
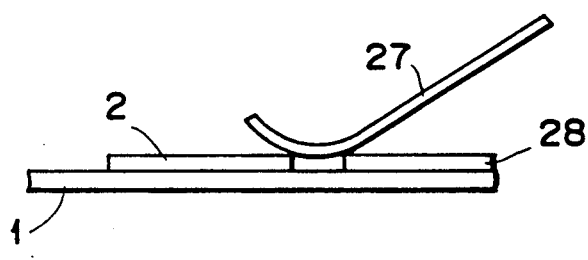

In FIG. 3B, the slider 27 contacts both the signal pattern 2 and the idle pattern or the lead wire 28, and a signal of L level is produced.

Figure 3C:
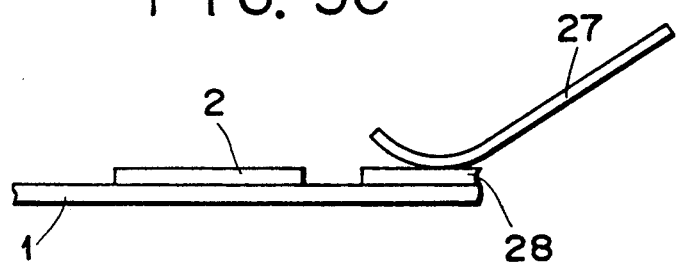

In FIG. 3C, the slider 27 contacts the idle pattern or the lead wire 28 and not the signal pattern 2, and a signal of H level is produced.

Figure 3D:
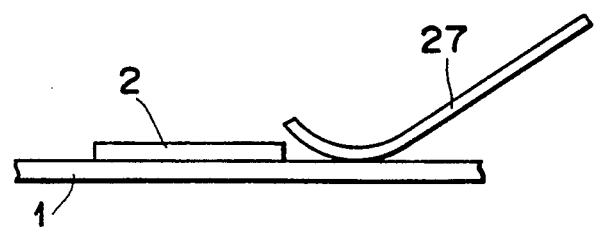

As shown in FIG. 3D, when the slider 27 directly contacts to the substrate 1, it does not contact to the signal pattern 2 and a signal of H level is produced.

As for the slider 25 which slides on the lead wire 8a of the island idle pattern 8, because of the presence of the idle patterns 14 and 15 on the opposite sides of the lead wire 8a, the slider 25 does not contact both the signal pattern 2 and the lead wire 8a of the island idle pattern 8 at the positions of the arrows Q, R, S and T which are between the signal pattern 2 and the idle pattern 14, the idle pattern -and the lead wire 8 of the island idle pattern 8, the lead wire 8a of the island idle pattern 8 and the idle pattern 15, and the idle pattern 15 and the signal pattern 2, respectively. Accordingly, no signal of L level is produced at the slider 24.

A problem that occurs if the signal pattern 2 and the lead wire 8b of the island idle pattern 8 are adjacent is now explained with reference to FIG. 5.

Figure 5:
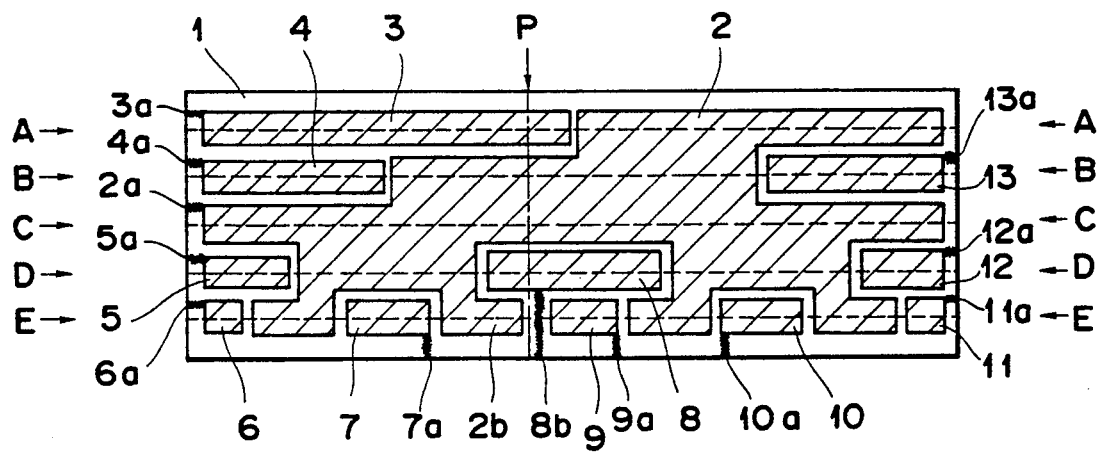
FIG. 5 shows a pattern plane of the encoder.

FIG. 5 shows a pattern plane of an encoder which is constructed to have adjacent signal pattern 2 and lead wire 8b of the island idle pattern 8.

Numeral 9 denotes an idle pattern, numeral 9a denotes a lead wire of a pattern 9, and arrow P shows an interval between the signal pattern 2 and the lead wire 8b of the idle pattern 8. Other numerals are identical to those of FIG. 1.

With the arrangement of FIG. 5, the slider 25 slides on the idle pattern 6, the signal pattern 2, the idle pattern 7, the signal pattern 2, the lead wire 8b of the island idle pattern 8, the idle pattern 9, the signal pattern 2, the idle pattern 10, the signal pattern 2 and the idle pattern 11, in this sequence or in the opposite sequence.

Where a portion 2b of the signal pattern 2 and the lead wire 8b of the island idle pattern 8 are arranged adjacently on the slide line of the slider as shown in FIG. 5, the slider 25 contacts to both the portion 2b of the signal pattern 2 and the lead wire 8b at the position of the arrow P between the signal pattern 2 and the lead wire 8b of the island idle pattern 8. The signal of the slider 25 is of the L level. Since the lead wire 8b is connected to the signal pattern 2 through the slider 25, the island idle pattern 8 produces a signal of the L level. At the position P, since the slider 24 which slides between D—D contacts to the island idle pattern P, it produces a signal of the L level. The island idle pattern 8 however, should not be connected to GND and a correct output signal should be of the H level. Thus, the output signal of the L level is an error signal.

In accordance with the present invention, since the lead wire of the island idle pattern which is the protective pattern not adjacent to the outer edge of the substrate has protective patterns intervening between it and the signal pattern, so that the lead wire and signal pattern are not adjacent to each other, the lead wire may be laid without any risk of occurrence of the aforementioned error signal.

Moreover, because the lead wire is laid in this manner, the island idle pattern can be gold-plated by the electrolytic plating and an encoder which is sufficiently durable against wear is provided.

We claim:

1. An encoder for producing a position signal in accordance with a position of a conductive slider, comprising:

a non-conductive substrate;

a first conductive pattern formed on said substrate; and a plurality of at least three second conductive patterns formed on said substrate;

said second patterns being independent from said first pattern and spaced from each other, and each having a lead wire extending to an edge of said substrate;

said conductive slider being slidable along said substrate for producing a first electrical state signal when said conductive slider abuts against said first pattern and producing a second electrical state signal when said conductive slider abuts against one of a said second pattern and said substrate;

said position signal being generated based on whether said conductive slider produces said first electrical state signal or said second electrical state signal; and wherein one of said second patterns is substantially surrounded by said first pattern and the remaining said second patterns, with at least two of said remaining second patterns disposed outwardly to one side of said one second pattern in a space between portions of said first pattern which are adjacent in a sliding direction of said conductive slider, and wherein the lead wire extending from said one of said second patterns passes between said two of said remaining second patterns and extends exteriorly of said first pattern, such that said conductive slider cannot simultaneously contact either of said adjacent portions of said first pattern and said lead wire extending from said one second pattern.

2. An encoder according to claim 1, wherein each of said first pattern and said second patterns includes a respective portion formed by electrolytic plating.

* * * * *